United States Patent [19]

Hartlage et al.

[11] 3,725,046

[45] Apr. 3, 1973

[54] SOLVENT EXTRACTION PROCESS FOR THE RECOVERY OF COPPER VALUES

[75] Inventors: James Albert Hartlage, Burnsville; Alvin Dale Cronberg, Bloomington, both of Minn.

[73] Assignee: Ashland Oil, Inc., Ashland, Ky.

[22] Filed: Feb. 22, 1971

[21] Appl. No.: 117,826

[52] U.S. Cl.................75/101 BE, 75/117, 23/312 R
[51] Int. Cl..............................................C22b 15/08
[58] Field of Search........75/101 BE, 117; 23/312 R, 23/312 ME

[56] References Cited

UNITED STATES PATENTS

| | | | |
|---|---|---|---|
| 3,224,873 | 12/1965 | Swanson | 75/101 R |
| 3,131,998 | 5/1964 | Swanson | 75/101 BE UX |
| 3,239,565 | 3/1966 | Kreevoy et al. | 75/101 BE UX |
| 3,428,449 | 2/1969 | Swanson | 75/117 |
| 3,449,246 | 6/1969 | Pelka et al. | 75/101 BE UX |
| 3,558,288 | 1/1971 | Burrows | 23/312 |

*Primary Examiner*—G. T. Ozaki
*Attorney*—Walter H. Schneider, William Kammerer, Van D. Harrison, Jr. and Harold M. Dixon

[57] ABSTRACT

The coalescence rate of an aqueous/liquid hydrocarbon emulsion system is enhanced by the presence of an alkylated phenol as a minor part of the organic phase. Such hydrocarbon solutions further containing a chelation metal collector can be advantageously employed in the liquid ion exchange process for the extractive recovery of metal values from dilute aqueous solutions thereof.

7 Claims, No Drawings

SOLVENT EXTRACTION PROCESS FOR THE RECOVERY OF COPPER VALUES

BACKGROUND OF THE INVENTION

1. Field of the Invention

This invention relates to an improvement in a liquid-liquid hydrometallurgical extraction process for the recovery of metal values from dilute aqueous solutions thereof.

2. Description of the Prior Art

The application of liquid ion exchange extraction principles to hydrometallurgical operations for the recovery of metal values from dilute aqueous solutions thereof or the fractionation of a mixture of such values, has of late commanded ever increasing attention from the hydrometallurgy industry. Developments, have, however, progressed in this area to the extent that it is now commercially feasible to recover the copper values from leaches of low grade sulfide ores in a sufficiently pure and concentrated form so as to permit the electrolytic refinement thereof.

The liquid ion exchange process, in context of extractive metallurgy, basically involves two distinct steps. In the first step, an impure aqueous phase containing the desired metal values in ionic form is intimately contacted with a water-immiscible organic solution of a metal ion collector to facilitate an interfacial relationship of the phases whereby the metal ions are readily and preferentially extracted into the organic phase. The second step, referred to as stripping, serves to regenerate the extracted metal values in ionic form and to effect the transfer thereof to an aqueous phase to provide a pure and relatively concentrated solution of the desired metal.

There are two general types of metal ion collectors which have found use in the aforedescribed liquid extraction process; namely, those that form a heteropolar or electrovalent salt with a metal ion and those forming internal (chelate) complexes therewith. The latter type are favored because of their inherent versatility and demonstrated potential for purifying and concentrating metal values from solutions economically. From a technical standpoint, the chelation metal collectors are organic compounds containing, in addition to a replaceable hydrogen atom, a functional group of basic character, such as $NH_2$, $=N-$, and $>O$. Such collectors are capable of coordinating with a metal ion through covalent bonding to form a relatively stable five- or six-membered ring. The most effective of this type of collector known presently are those compounds which contain either the 8-hydroxy quinoline structure or a hydroxy hydrocarbyl substituted oxime radical in the molecular configuration thereof. Of the latter, those compounds wherein the hydrocarbyl substituent is aromatic are proposed as being the more efficient collectors of this class.

Notwithstanding that the hydrometallurgy industry has had made available to them highly effective chelation collectors, an unassociated problem nevertheless remains in carrying out the extraction process. As indicated previously, the extraction step as well as the stripping step call for intimately mixing an organic phase with an aqueous phase. Technically this gives rise to an emulsion system and therefore an ensuing sharp and quick separation of the phases, particularly a fast separation, is essential in order to have a commercially applicable extraction process. Fast separation of the phases is of utmost importance because the coalescence rate governs the amount of aqueous solution which can be extracted per unit of time. Sharp separation is necessary because essentially no loss of the costly collector by entrainment in the aqueous raffinate can be economically tolerated. Moreover, the loaded aqueous phase provided by the stripping step must be free of entrained material so that the efficiency of the subsequent electrolytic refinement operation is not adversely affected.

Heretofore, it has been known that the presence of a higher alcohol, e.g., isodecanol, in the organic phase during either the extraction or stripping step enhances the rate of coalescence of the respective phases in the settling operation. However, the need remains for a surface active agent which will not only provide a faster rate of coalescence but for one which will result in a cleaner separation of the phases upon coalescence.

SUMMARY OF THE INVENTION

In accordance with the present invention, an alkylated phenol having an alkyl moiety containing from six to 12 carbon atoms is utilized in conjunction with a metal ion collector in an otherwise conventional liquid-liquid ion exchange extraction process for the recovery of metal values from dilute aqueous solutions thereof.

The inclusion of the alkylated phenol in the solvent extraction phase pursuant to the practice of this invention permits a markedly fast and sharp separation of the respective phases in effecting the extraction and stripping steps of the overall process. A further advantage of the alkylated phenol over the most effective agents for this purpose known to the art resides in the unexpected ability thereof in promoting a substantial increase of stripping efficiency, thereby resulting in a corresponding increase in the overall metal extraction efficiency.

DESCRIPTION OF THE PREFERRED EMBODIMENTS

The water-immiscible organic solvents suitable for carrying out the extraction process concerned herein include the various hydrocarbon solvents in which the chelation collector is soluble. Other properties characterizing an acceptable solvent are stability, low toxicity and high flash point. Such solvents can be the aliphatic, aromatic or alkyl aromatic hydrocarbons derived from petroleum sources. Representative solvents are such as toluene, xylene, kerosene, various high flash naphtha cuts and the like including mixtures thereof. A particularly preferred solvent is a kerosene cut especially produced for extraction purposes; namely, Napoleum 470 (Kerr-McGee Industries).

As indicated hereinabove, the alkylated phenols useful in the practice of this invention are preferably used in conjunction with a metal ion collector of the type which forms a chelate with the metal ion in the extraction recovery process. Especially effective collectors of this type as well as the methods for the preparation thereof are disclosed and claimed in U.S. Ser. No. 715,879, filed Mar. 25, 1968, now U.S. Pat. No. 3,637,711. These collectors are characterized in exhibiting a very high loading capacity; excellent solubility in hydrocarbon solvents, particularly the aliphatic or cycloaliphatic types; essentially nil solubility in highly acidic aqueous solutions, and outstanding chemical stability. The preferred compounds of the foregoing type correspond to the following structural formula:

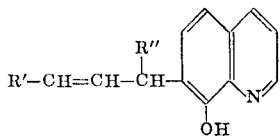

where R' and R'' are hydrogen or alkyl collectively having a sum total of from five to about 14 carbon atoms.

The 7-beta-alkenyl substituted 8-hydroxy quinolines depicted above can be prepared by reacting an alkali metal salt of 8-hydroxy quinoline with an allylic chloride or bromide corresponding to the formula R' CH = CH(R'')X wherein R' and R'' are as defined above. The reaction is most conveniently carried out in the presence of an inert organic solvent. Either the non-polar solvents or polar organic solvents of lesser acidity than the 8-hydroxyquinoline are applicable. The reaction of 8-hydroxy quinoline with dodecenyl chloride (1-chloro-5,5,7,7-tetramethyl-2-octene) yields the preferred chelation collector of the class noted above; namely, 7-[3-(5,5,7,7-tetramethyl-1-octenyl)]-8-hydroxy quinoline.

A further class of chelation collectors of the substituted oxime type and methods for the preparation thereof can be found described in Belgian Pat. No. 688,482. Preferred collectors of this type are purported to be the 2-hydroxy benzophenoximes which additionally can carry alkyl substituents on either or both of the aromatic nuclei.

The alkylated phenols useful in the practice of this invention include those alkylates of phenol wherein the alkyl moiety contains from six to 12 carbon atoms. These alkylates can be readily prepared by alkylating a $C_6 - C_{12}$ olefin or alkyl mono-chloride with phenol in the presence of a conventional Friedel-Crafts alkylation catalyst, e.g., aluminum chloride. The preferred alkylating agents for deriving the alkylated phenols useful herein include the dimer, trimer or tetramer of propylene which result in the formation of hexyl-, nonyl-, and dodecyl phenol, respectively. The nonyl phenol prepared in this manner is especially preferred since it is readily available as a commercial product.

It is conventional in the hydrometallurgy industry to refer to the compositional makeup of the organic extraction medium in terms of volumetric proportions. This practice presumably is resorted to because the chelation collector as well as the surface active agent normally used in conjunction therewith in the hydrometallurgical extraction art are liquid materials. Accordingly, the volumetric ratio of chelation collector to the hydrocarbon solvent can acceptably range from about 1:99 to 25:75, respectively. More conventionally, however, such a ratio of chelation collector to solvent ranges from 1:99 to 10:90, respectively.

The volumetric ratio of chelation collector to the surface active agent, usually referred to as a modifier, broadly ranges from about 5:95 to 50:50, and more preferably from 15:85 to 30:70, respectively. The organic phase comprising the metal collector, modifier and solvent, when employed to extract a dilute aqueous solution of metal values can be used in the amount ranging from 0.1 to 10 times the volume of the aqueous phase. More usually, however, the ratio of organic phase to said aqueous phase is from about 1:5 to 5:1, respectively. The extraction step can be carried out as a single operation but more preferably is conducted in two or three stages wherein the aqueous phase flows through the extraction system countercurrently with respect to the organic phase. Conventionally, the pregnant or loaded organic phase is subjected to washing prior to the stripping operation. The stripping operation likewise can be conducted in one or more stages. The usual stripping solution is a strong acid solution of such mineral acids as sulfuric acid and hydrochloric acid. It is further known that if the stripping solution contains an optimum amount of the metal values to be recovered from the loaded organic phase, stripping efficiency is optimized. Further details concerning the manner for implementing solvent extraction techniques as generally described above can be found in Bulletin No. T4-B32 of the Denver Equipment Company.

In order to illustrate to those skilled in the art the best mode contemplated for carrying out the present invention, the following working examples are given. As indicated, these examples are given primarily by way of illustration and accordingly any enumeration of details contained therein should not be construed as a limitation on the invention except to the extent expressed in the appended claims. All percentages given are on the volumetric basis unless otherwise indicated.

EXAMPLE I

This example is illustrative of the improvement realized in the practice of this invention in effecting the separation of a loaded organic or solvent phase from the barren aqueous phase following an extraction operation. The barren organic phase employed in each test contained 2.5 percent of 7-[3-(5,5,7,7-tetramethyl-1-octenyl)]-8-hydroxyquinoline as the metal ion collector which was combined with the modifier under test in the amount shown in the following Table I, with kerosene (Napoleum 470) constituting the balance.

The pregnant aqueous phase employed in each test herein was a 400 ml solution of copper sulphate containing 2.98 grams of copper per liter and having a pH of 1.5. Extraction was effected by vigorously shaking the pregnant aqueous solution with 600 ml of the organic solution for two minutes. Following extraction, the coalescence rate of the aqueous phase was observed by noting the time required in attaining complete separation. In this and subsequent examples, nonyl phenol was compared with iso-decanol which the industry considers to be representative of the most effective of the prior art modifiers.

Further details concerning the individual tests of this example, together with the results obtained are set forth in the following Table I.

TABLE I
Aqueous Coalescence Rate - Extraction

| Ml of Clear Aqueous Layer | 100 | 200 | 300 | 400 |
|---|---|---|---|---|
| Test 1: Solvent System A | 34" | 50" | 1' 12" | 2' 15" |
| Test 2: Solvent System B | 1' 8" | 1' 38" | 2' 10" | 3' 0" |
| Test 3: Solvent System C | 45" | 1' 25" | 2' 12" | 3' 45" |

System A - 2.5% collector; 10% nonyl phenol; 87.5% Napoleum 470
System B -    "         "    ; 5%     "       "   ; 93.5%    "
System C -    "         "    ; 10% isodecanol     ; 87.5%    "

EXAMPLE II

This example illustrates the improvement in the efficiency of the stripping operation when using nonyl phenol as a modifier for the organic solvent phase. In the various tests of this example, 500 ml of the loaded organic phase were contacted with 250 ml of stripping solutions of varying copper and sulfuric acid content. In all tests, the loaded organic phase contained 2.5 percent of the chelation collector utilized in Example I. The content of the modifier was varied as indicated in Table II set forth hereinbelow. In all tests, the organic solvent was Napoleum 470. The stripping operation consisted of vigorously shaking the loaded organic phase with the stripping solution for 2 minutes in a 1 liter graduated cylinder. The results of the individual tests are given in the following Table II.

complete separation of the phases. The coalescence data given in the following Table III was obtained while conducting Test Nos. 1, 2 and 4 of Example II.

TABLE III
Aqueous Coalescence Rate - Stripping

| Ml of Clear Aqueous Layer | 100 | 200 | 250 |
|---|---|---|---|
| System D (Test 2, Ex. 2) | 1' 48" | 2' 54" | 3' 30" |
| System E (Test 4, Ex. 2) | 1' 54" | 3' 9" | 3' 48" |
| System F (Test 1, Ex. 2) | 3' 0" | 5' 0" | 6' 0" |

We claim:

1. In a liquid ion exchange process for the recovery of copper values from a dilute aqueous solution thereof wherein said aqueous solution is intimately contacted with a hydrocarbon solvent containing an 8-hydroxy quinoline substituted in the No. 7 position with a β-alkenyl group having from eight to 17 carbon atoms chelation collector dissolved therein to provide a loaded organic phase and wherein said loaded organic phase is separated and thereupon intimately contacted with an aqueous acidic stripping solution to provide a pregnant aqueous phase from whence the copper values are recovered; the improvement of incorporating into said hydrocarbon solvent an alkylated phenol having an alkyl moiety containing from six to 12 carbon atoms in an amount providing a volumetric ratio of the chelation collector to the alkylated phenol of from

TABLE II

| Test No. | Organic modifier | Stage | Analysis before 2 min. contact (g.p.l.) | | | Analysis after contact (g.p.l.) | |
|---|---|---|---|---|---|---|---|
| | | | Cu in organic | Stripping solution Cu | Stripping solution $H_2SO_4$ | Stripped organic Cu | Strip solution Cu |
| 1 | 10 vol. percent isodecanol | 1 | 1.63 | 22.80 | 148.7 | 0.62 | 48.80 |
| | | 2 | 0.62 | 22.80 | 148.7 | 0.48 | 23.10 |
| 2 | 10 vol. percent nonyl phenol | 1 | 1.54 | 22.80 | 148.7 | 0.13 | 25.70 |
| | | 2 | 0.13 | 22.80 | 148.7 | 0.09 | 22.85 |
| 3 | 7.5 vol. percent nonyl phenol | 1 | 1.58 | 22.80 | 148.7 | 0.15 | 25.70 |
| | | 2 | .15 | 22.80 | 148.7 | 0.12 | 22.92 |
| 4 | 5 vol. percent nonyl phenol | 1 | 1.58 | 22.80 | 148.7 | 0.35 | 25.35 |
| | | 2 | 0.35 | 22.80 | 148.7 | 0.21 | 23.00 |
| 5 | 10 vol. percent isodecanol | 1 | 1.82 | 21.10 | 118.10 | 0.82 | 23.48 |
| | | 2 | 0.82 | 21.10 | 118.10 | 0.67 | 21.42 |
| | | 3 | 0.67 | 21.10 | 118.10 | 0.63 | 21.27 |
| 6 | 7.5 vol. percent nonyl phenol | 1 | 1.80 | 21.10 | 118.10 | 0.39 | 23.79 |
| | | 2 | 0.39 | 21.10 | 118.10 | 0.20 | 21.45 |
| | | 3 | 0.20 | 21.10 | 118.10 | 0.15 | 21.18 |
| 7 | 10 vol. percent idodecanol | 1 | 1.78 | 30.78 | 148.5 | 0.51 | 33.38 |
| | | 2 | 0.51 | 30.78 | 148.5 | 0.37 | 31.08 |
| | | 3 | 0.41 | 30.78 | 148.5 | 0.27 | 30.95 |
| 8 | 7.5 vol. percent nonyl phenol | 1 | 1.80 | 30.78 | 148.5 | 0.17 | 34.00 |
| | | 2 | .17 | 30.78 | 148.5 | 0.06 | 31.10 |

The results of tests 1 through 4 show that the presence of nonyl phenol substantially improves the efficiency of the stripping operation as evidenced by the lower copper content of the stripped solvents. The data show that there is nearly 0.4 gpl less copper in the stripped solvents containing the nonyl phenol as a modifier. Since the amount of collector present in each test has a loading capacity of about 1.8 – 1.9 g/l copper, the stripped organic solvents containing the nonyl phenol would have an effective extraction capacity of nearly 1.7 g/l in any recycling thereof as compared to about 1.3 g/l for the barren or stripped solvent wherein isodecanol is employed as the modifier.

EXAMPLE III

This example is illustrative of the improvement realized in the practice of this invention in effecting the separation of a barren organic phase from a loaded aqueous phase following a stripping operation.

As in Example I, the phase disengagement testing was carried out by noting the time required in attaining about 5:95 to 50:50, respectively.

2. The improvement in accordance with claim 1 wherein said alkylated phenol is hexyl phenol, nonyl phenol, dodecyl phenol or mixtures thereof.

3. The improvement in accordance with claim 2 wherein said alkylated phenol is nonyl phenol.

4. The improvement in accordance with claim 3 wherein said chelation collector is 7-[3-(5,5,7,7-tetramethyl-1-octenyl)]-8-hydroxyquinoline.

5. The improvement in accordance with claim 4 wherein the chelation collector and the hydrocarbon solvent are present in a volumetric ratio of from about 1:99 to 25:75, respectively.

6. The improvement in accordance with claim 5 wherein said chelation collector and nonyl phenol are present in a volumetric ratio of from 15:85 to 30:70, respectively.

7. The improvement in accordance with claim 6 wherein the chelation collector and the hydrocarbon solvent are present in a volumetric ratio of from about 1:99 to 10:90, respectively.

* * * * *